(12) United States Patent
McGahhey (10) Patent No.: US 6,336,489 B1
(45) Date of Patent: Jan. 8, 2002

(54) METHOD AND APPARATUS FOR IMPULSE SEALING POLYMERIC VIALS IN TANDEM

(76) Inventor: Kent McGahhey, 1806 E. St. Peter St., New Iberia, LA (US) 70560

( * ) Notice: Subject to any disclaimer, the term of this patent is extended or adjusted under 35 U.S.C. 154(b) by 83 days.

(21) Appl. No.: 09/585,056

(22) Filed: Jun. 1, 2000

(51) Int. Cl.$^7$ ................................................ B30B 15/34
(52) U.S. Cl. .................... 156/368; 156/579; 156/583.2
(58) Field of Search ................................ 156/350, 367, 156/368, 579, 580, 581, 583.1, 583.2

(56) References Cited

U.S. PATENT DOCUMENTS

| | | | | |
|---|---|---|---|---|
| 4,010,063 A | * | 3/1977 | Natter ......................... | 156/510 |
| 4,055,456 A | * | 10/1977 | Carnegie, Jr. ............... | 156/366 |
| 4,075,818 A | * | 2/1978 | Wright et al. ............. | 53/180 R |
| 4,359,361 A | * | 11/1982 | Wright ........................ | 156/497 |
| 4,900,380 A | * | 2/1990 | Matsuzawa et al. ....... | 156/73.1 |
| 5,149,943 A | * | 9/1992 | Kupcikevicius et al. .... | 219/243 |

OTHER PUBLICATIONS

Service Manual for Vertrod Thermal Impulse Heat Sealer Model No. 14HTV.#jf139##

Primary Examiner—James Sells
(74) Attorney, Agent, or Firm—Robert N. Montgomery (57) ABSTRACT

An improved vertical, vial, impulse heat sealing apparatus, the improvements including a light weight, precision milled frame with increased interchangability of component parts and increased structural strength, a more positive toggle system that eliminates misalignments and allows more stringent tolerances, a safety lock system to prevent operating personnel injury, improved stability and leverage efficiency, improved heat distribution, modular precision components for improved maintenance capability, improved terminal connector materials and method for installing replacement heater bands, improved connector-wire routing, provisions for precision shim plate adjustment specially adapted for use with proprietary vials arranged in three tandem units of five vials each, special designed precision vial holders, and an alternate embodiment provides a conversion package for converting existing apparatus for automatic operation and improved safety.

11 Claims, 7 Drawing Sheets

METHOD AND APPARATUS FOR IMPULSE SEALING POLYMERIC VIALS IN TANDEM

BACKGROUND OF THE INVENTION

1. Field of the Invention

This invention relates generally to heat sealing apparatus and more particularly to an improved impulse heat sealing station for sealing polymeric medical vials in tandem after filling with a medicament.

2. General Background

Manually operated heat sealing apparatus such as the Virtrod™ have been in use for many years and have been adapted for use as medical vial sealing apparatus. However, such apparatus are considered archaic by today's standards. While spare parts and technical support are still available from some companies, such as TechnaSeal™, improved automated heat sealing machines have been developed to increase production demands. However, it is recognized that these older model vertical, special impulse heat sealing machines still play a vital role in today's medical labs where medications can be produced and packaged in relatively small quantities on site. As production requirements increase in such labs a heavy demand is placed on these older types of heat sealing machines. There comes a point where it is no longer economical to expand the capacity of the machines or maintain the equipment with spare parts, which continue to increase in cost, as originally designed. Expanding the number of vials per load or increasing vial material thickness exerts excessive strain on the toggles and reduces sealing quality due to inadequate heat distribution, resulting in higher maintenance cost and poor quality products. In most such machines like the Virtrod™ vertical vial sealer, sealing is achieved by simply bringing a movable heater head into contact with a stationary heater head. The polymeric material is thus pinched between the heads and heat is applied by an electrical heat strip running the length of the heads. The individual vials are held in racks of 4 or 8. The manually operated machines generally utilize a single over-center toggle lever to move the movable heater head into contact with the stationary head. The heat cycle is then timed to provide sufficient melting of the polymeric vial material and thus produce an effective seal However, as production requirements increase, the base units remains the same and longer heater heads are provided with higher wattage heater strips to accommodate longer racks of up to 14 vials. The single toggle operation then becomes over stressed and the toggle linkage becomes loose, causing misalignments of the heater bars, and allows for insufficient pressure on some of the vials, especially at the outer ends, thereby causing some vials to burn while others fail to make an effective seal. Such excessive heat causes the heater strips to have hot spots resulting in early failure. The longer heater bars are heavier, thereby requiring more torque to lift the movable bar, requiring operators to use both hands. Since no provision is made to shield the movable heater bar or provide a second handle, operators often receive severe burns. Further, since both hands are often used to operate the movable bars, it becomes more difficult to manipulate the movable head and hold the vial rack in position relative to the stationary heater head. No provision is made to hold the heavier movable heater heads in the up or open position while removing and replacing the vial racks, thereby resulting in more personnel injury due to burns. No provision is made to insure heater head alignment or to accommodate different thicknesses of vial polymeric materials. No provision is made to insure the proper pressure is placed on each vial to insure a quality seal.

Polymeric vials are often produced in multi-cavity molds. When the vials are removed from such molds they are linked to each other by a relatively heavy web in groups or sets. It has been found that removing these webs takes time and excessive handling. In some cases, where sets of heat sealed packets are required, they are filled in the horizontal position or on a continuous feed system. In any case hand operated or manual sealing systems usually use only individual vials. Therefore, provisions need to be made to use the groups or sets, as produced by the vials manufacturing process, instead of handling the vials individually. This speeds up the filling and heat sealing process as well. However, it becomes necessary to provide precision racks and sealing head members with very efficient heat transfer capability to handle the groups in tandem.

No provision is made for non technical personnel to make repairs to this type of equipment. Simply replacing a heat strip is a major operation which often requires great dexterity due to the spring tensioning apparatus and procedure.

The prior art heater bars usually consist of a steel rectangular bar having a hole running lengthwise therethrough and tapped to receive water fittings. The bar is fitted at each end with a recessed terminal block composed of a micarta block with a stem portion extending from one side and tapped to receive a small screw on the opposite side. The terminal blocks are biased towards each end of the heater bar by a small spring imposed over the stem portion. The heater band is fitted with a pig tail wire at each end, soldered to the band at one end with a jack plug at the other. The band is then attached to the terminal connectors by compressing the two terminal blocks within the recesses in the heater block, thereby overcoming their bias and securing the heater band in place by the small screws mentioned above. This procedure requires more than two hands to accomplish and the heater bands often become loose relative to the micarta terminal blocks and burn the micarta resulting in premature failure. Teflon cloth strips are placed on either side of the heater bands and retained in place by elongated Teflon clamping strips, heat being dissipated throughout the heater bar as a function of its cross sectional area. Obviously, a better method is needed for replacing and protecting the heater bands and providing a more even distribution of heat.

Therefore, it behooves the industry to redesign the machines from time to time to improve their efficiency and thus improve their reliability, economics, and production capacity.

It is therefore an object of the this invention to provide a familiar but improved vertical, impulse heat sealing machine having a more substantial mechanical operating linkage for easier operation and more even distribution of pressure over the movable heater bars.

A further object is to provide a safer operation by providing insulated handles and locking bars.

Another object is to provide improved alignment between the moving and stationary heater bars and improve heat distribution along the bars.

Still another object is to reduce weight, improve replaceability, reduce maintenance and operating cost, improve handling efficiency, and maximize quality.

SUMMARY OF THE INVENTION

An improved vertical, vial, impulse heat sealing apparatus, the improvements including a light weight, precision milled frame with interchangability of component parts and increased structural strength, a more positive toggle system that eliminates misalignments allowing more stringent tolerances, a safety lock system to prevent operating personnel injury, improved stability and leverage efficiency, improved heat distribution, modular precision components for improved interchangability, improved terminal connector materials and method of heater band installation, improved connector-wire routing for improved heater bar replacement, provisions for precision shim plates specially adapted for use with proprietary vials in three tandem units of five vials each, specially designed precision vial holders, and an alternate embodiment providing a pneumatic conversion package for automatic operation and improved safety.

BRIEF DESCRIPTION OF THE DRAWINGS

For a further understanding of the nature and objects of the present invention, reference should be made to the following detailed description taken in conjunction with the accompanying drawings, in which, like parts are given like reference numerals, and wherein.

DETAILED DESCRIPTION OF THE PREFERRED EMBODIMENT

Figure 1:
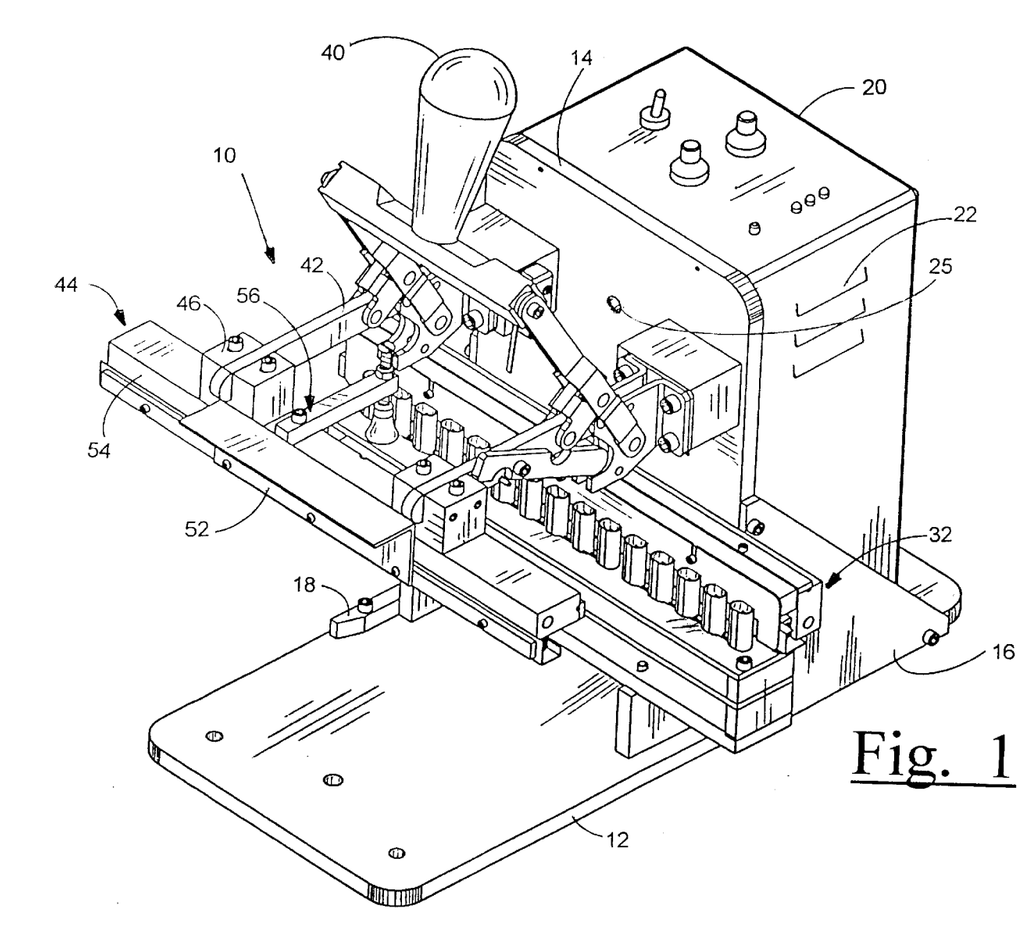
FIG. 1 is an isometric full assembly view of the improved heat sealing apparatus in the open position with vials and vial holder in position.
Figure 2:
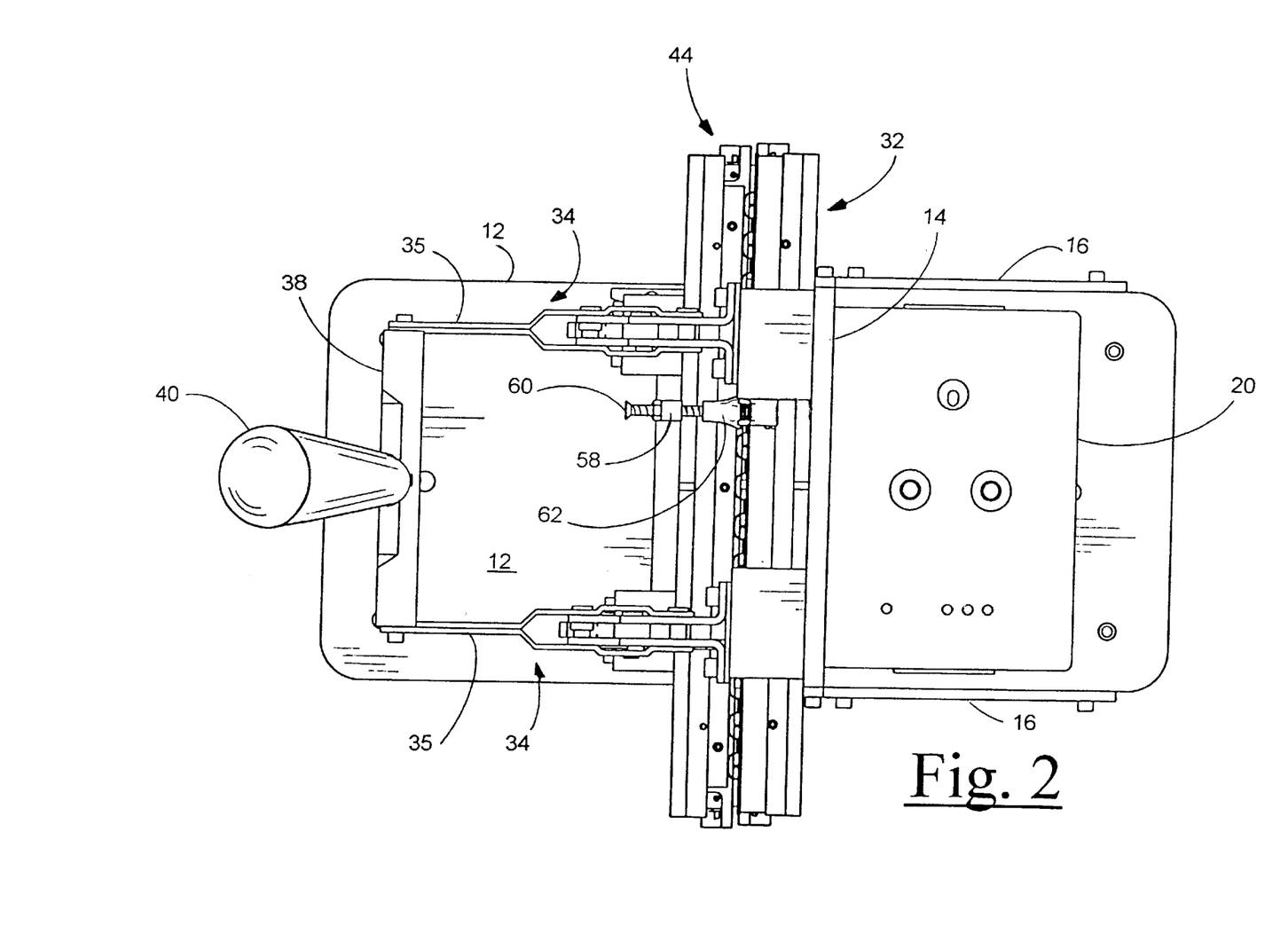
FIG. 2 is a top view of the assembly seen in FIG. 1.
Figure 3:
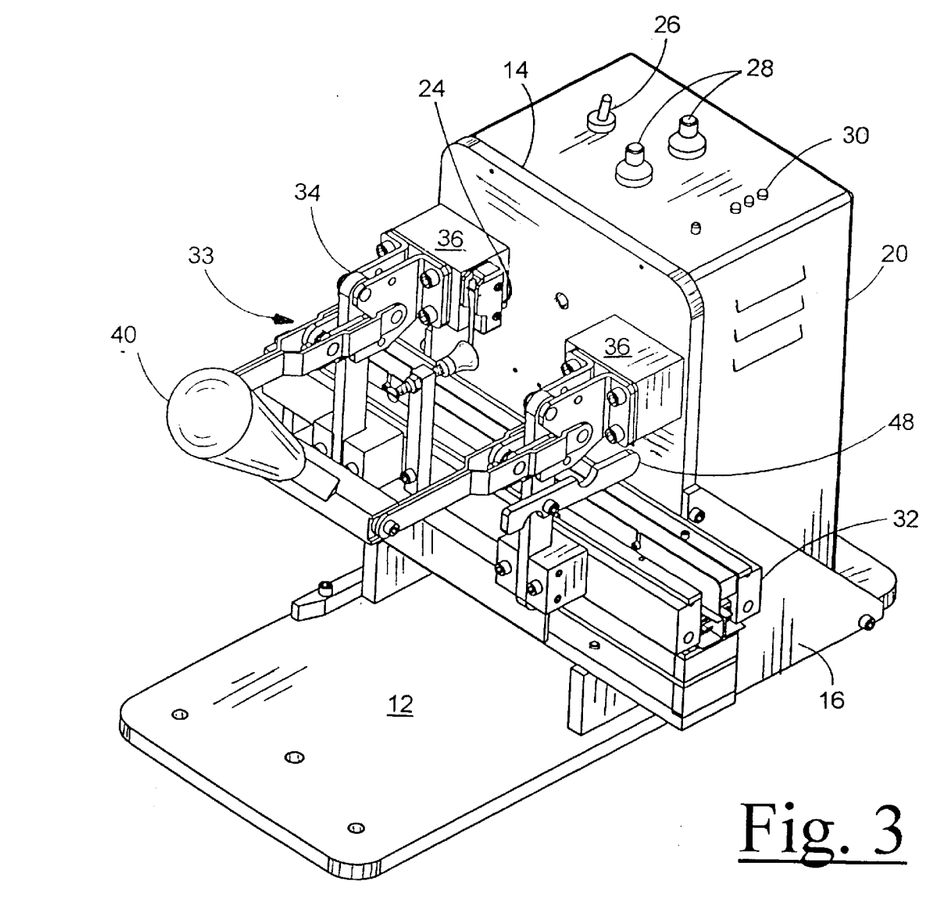
FIG. 3 is an isometric full assembly view of the improved heat sealing apparatus in the closed position with vials and vial holder in position.

As first seen in FIG. 1, the improved vertical, impulse heat sealing assembly apparatus includes a base plate 12 machined from light weight aluminum, a vertical plate 14 flanked on each side and held in an attached position by gusset plates 16, better seen in FIG. 2, attached at each side of the base plate 12, a guide bar 18 attached to the upper or work surface of the base plate 12, and an electrical control enclosure 20 fitted to the back or control side of the vertical plate 14. The upper surface of the base plate 12 should be smooth and flat and the vertical plate 14 should be rigid, stable and perpendicular to the upper surface of the base plate 12. The electrical controls are mounted to the control side of the vertical plate 14 and enclosed by panel 20 attached to the vertical plate 14 and the base plate 12. The enclosure 20 is vented with louvers 22 to dissipate internal heat. Wiring from the heater bars 32, 44 are fed through holes 25 in the vertical mounting plate 14 for connecton to electrical controls located in the enclosure 20. The electrical enclosure 20 contains all electrical components within, having only control switch 26 and buttons 28 and indicator lights 30 exposed as seen in FIG. 3. A stationary heater bar is attached to the mounting face of the vertical plate 14 opposite the control enclosure 20 and precision machined to be parallel with and at a precise height above the base plate 12.

Figure 4:
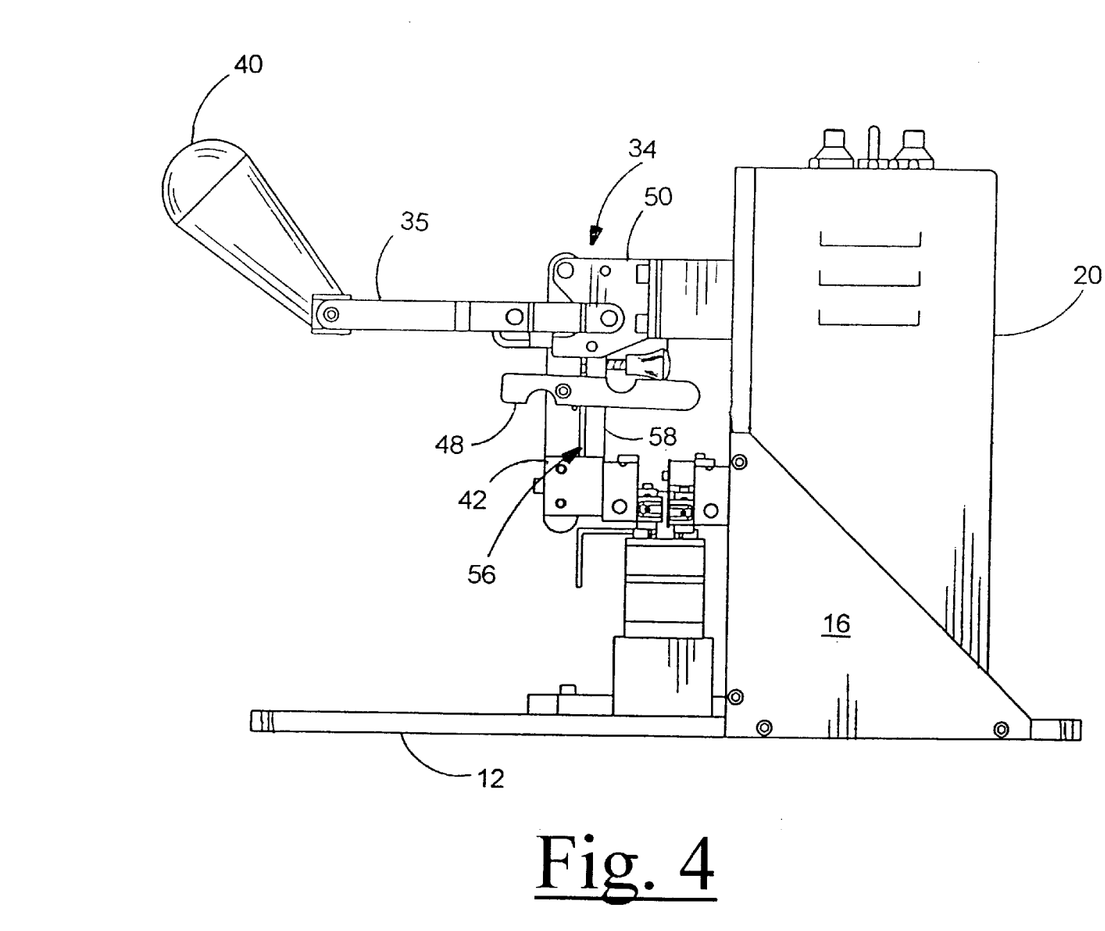
FIG. 4 is a vertical side view of the improved heat sealing apparatus in the closed position with vials and vial holder in position.

The movable arm assembly 33, seen in FIG. 3, includes a pair of over-center toggle clamps 34 mounted on spacer blocks 36, bolted to the vertical plate 14. The lever portion 35 of each of the toggle clamps 34 is connected to each other by connecting a handle bar 38, the handle bar 38 having a handle 40 located intermediate the toggle levers 35 and extending perpendicular thereto. The over-center clamp arms 42 of the toggle assembly 34 are rigidly connected to a movable heater bar 44 by blocks 46, which are in turn connected to the heater bar 44, as seen in FIG. 4, the assembly further including a lock bar 48 pivotally attached to one of the clamp arms 42 in a manner whereby an end of the lock bar 48 engages a notch in a stationary bracket portion 50 of the toggle assembly 34, as illustrated in FIG. 1. A lifting bar 52 attached to the heel 54 of the heater bar 44 is also provided to assist in lifting the movable heater bar 44 and help prevent personal injury from burns. A micro limit switch 24 shown mounted to spacer block 26 in FIG. 3 is activated by adjustable arm assembly 56, also attached to the movable heater bar 44, as best seen in FIG. 2. The assembly 56 includes a connecting bar 58, a threadable adjusting element 60, and a bumper element 62. In operation the limit switch 24 is contacted by the adjusting element 60 and its bumper element 62 when the movable heater head 44 is brought into near proximity with the stationary heater bar 32, thereby actuating the limit switch and the heater circuits for a timed cycle.

Figures 5, 5A:
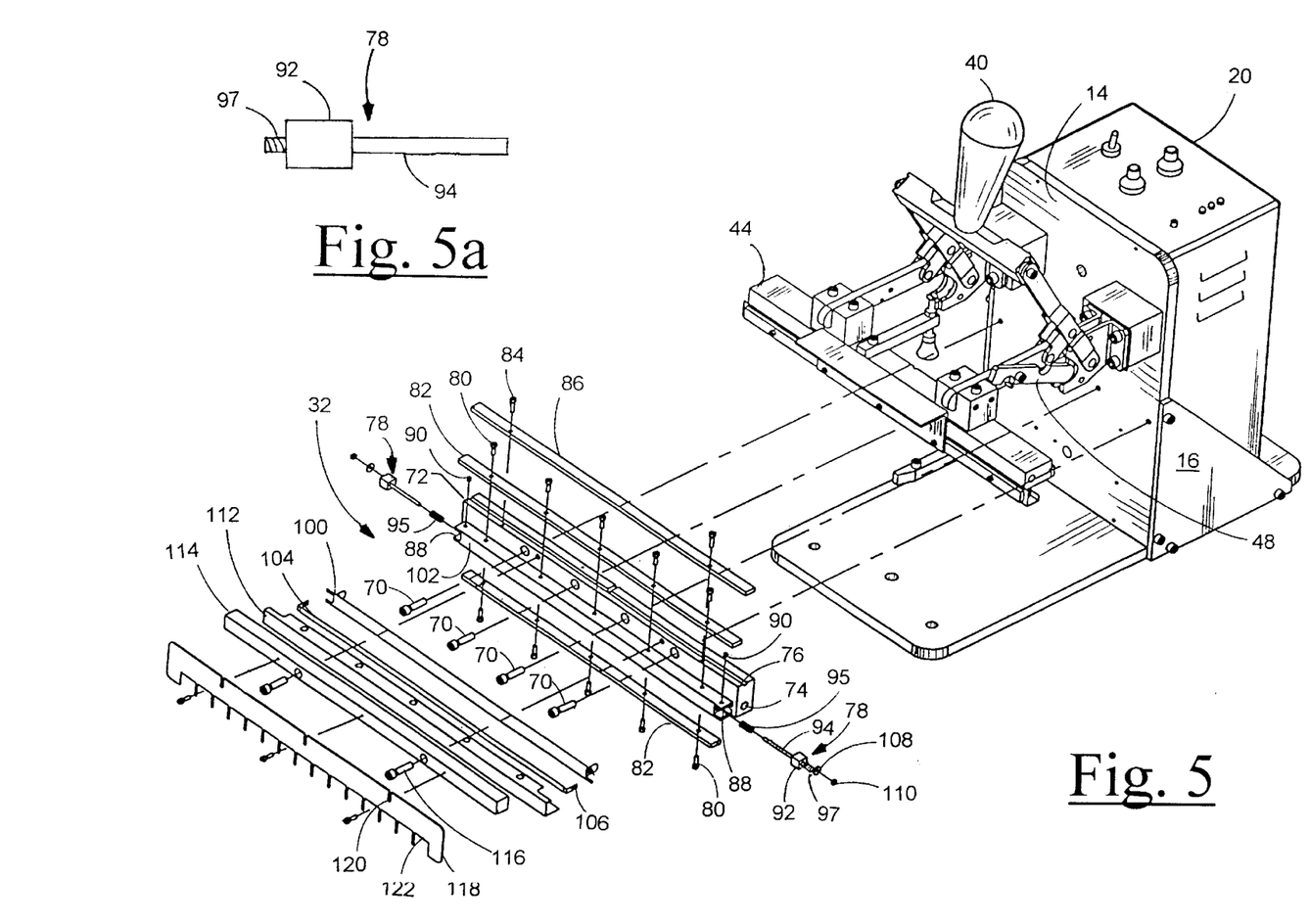
FIG. 5 is an exploded view of the stationary heater bar and its relation relative to the machine.
FIG. 5a is an enlarged side view of item 78 shown in FIG. 5.

Turning now to FIG. 5, we see that the stationary bar assembly 32 is typically mounted to the vertical plate 14 by four screws 70 passing through the precision machined heater bar 72. The one piece machined aluminum heater bar 72 is "L" shaped having vertical and horizontal leg portions which increases the bar's mass, thus increasing heat distribution. The horizontal portion, being the short leg portion of the "L", is recessed at each end for receiving a terminal connector 78 and tapped along its length at intervals on both top and bottom sides for receiving screws 80 passing through the brass retaining plates 82. The vertical portion of the bar 72 is through drilled lengthwise counter bored and tapped 74 at each end for water line fittings at each end and is grooved lengthwise along its upper edge to provide a wire channel 76. The bar is further tapped along its upper edge for receiving screws 84 passing through as securing cover strip 86. The notched recesses 88 are bored therein for receiving the pin and spring portion of the terminal connector assemblies 78 and are cross drilled and tapped to receive a set screw 90. Unlike previous heat sealers of this type, which use micarta terminal connection blocks tapped to receive a terminal screw which often becomes loose and burns, the connector 78 as shown in FIG. 5a includes a ceramic block 92 having an integral pin portion or super imposed around and upon a pin 94, the ceramic block is taped opposite the pin to receive a threaded stud 97. A connecting nut 110 and washer 108 are provided cooperative with said stud 97. When inserting the terminal connector 78 into the recess 88, a spring 95 is superimposed over a portion of the stud 94 in a manner whereby the terminal connector is biased towards the end of the bar 74. When installed, the spring is compressed and the set screws 90 set to retain the ceramic connector block 92 in place within the recess 88. A high temperature insulating adhesive backed strip 100, usually a Teflon coated fiberglass tape, is applied along the face 102 of the heater bar 72 conforming to all exposed surfaces and held firmly in place between the two brass plates 82. The electrical heater band 104 is attached by placing the eyelet 106 over the exposed portions of each connector terminal stud 94 and securing thereto with the aforementioned washer 108 and nut 110. The afore-mentioned set screws 90 are then loosened, thereby allowing the connector terminals to be extended due to biasing by the spring 95, thereby placing the heater band 104 in tension. A non-adhesive backed insulating tape 112 is applied over the heater band 104, thereby covering all of the exposed surfaces of the horizontal portion of the bar 72. The high temperature insulating strip 112 being carefully applied over the electrical heater strip 104 and between the brass strips 82 and the horizontal portion of the bar 72 adjacent each side of the heater band face 102.

Figure 6:
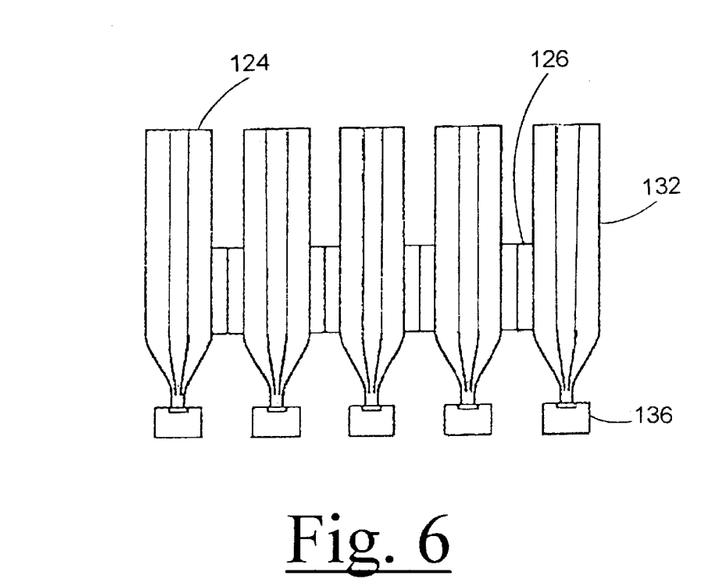
FIG. 6 is a front elevation view of the connected vials.
Figure 7:
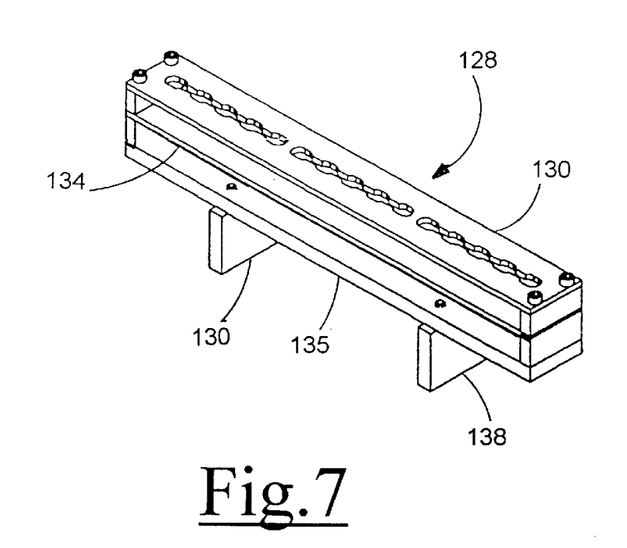
FIG. 7 is an isometric view of the vial fixture.
Figure 7A:
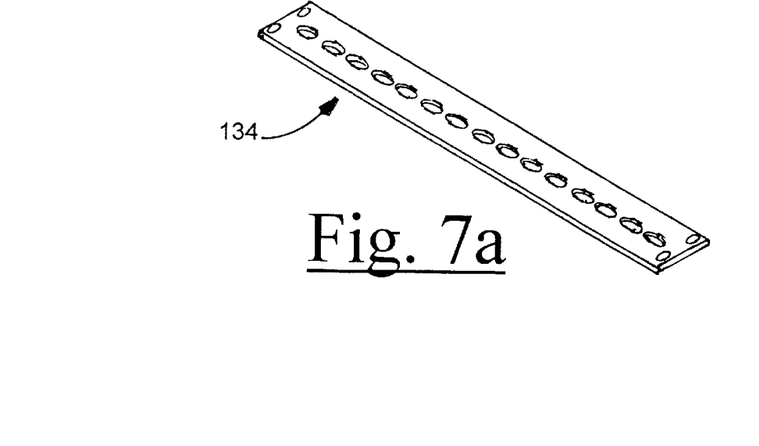
FIG. 7a is an isometric view of item 134 partially show in in FIG. 7.

A precision machined shim plate or bar 114 is attached to the stationary bar 72 adjacent the upper most brass plate 82 and secured to the bar 72 by screws 116. A precision machined aluminum shim strip having slots 120 along one edge for adjustably mounting the shim strip 118 vertically to the shim bar 114 and a series of notches 122 located along the opposite edge which correspond to the spacing between vials 124 as shown in FIG. 6 connected by webs 126 molded in groups of five each. Therefore, the spacing between the vials 124 matches the spacing of the notches 122 of the shim plates 118 and the thickness of the shim plate 118 corresponds to the thickness of the vial's walls when properly sealed. In grouping the vials 124 in tandem or set of three groups of five vials each, a space equal to one web space is also provided between each group. The use of a shim plate 118 provides a method for controlling pressure uniformity and a neat appearance to the sealed vials. The vials 124 are held in precise location relative to the notches 122 in the shim plate 118 by a the vial filling and sealing fixture assembly 128 shown in FIG. 7. The fixture is precision machined to match the vial groups as molded, shown in FIG. 7, and located in tandem of three sets. The fixture includes an upper horizontal plate machined to receive the upper tube portion 132 of the vials 124 and a second horizontal plate 134 shown in FIG. 7a is adapted to receive the tip 136 and or lower portion of the vial 124. However, the vial openings in the plate 134 are not connected. Vertical plates 138 attached on edge to a third horizontal bar 135 serve as spacers and guide plate members to determine the precise height from the base plate to point of contact of the vial with the uppermost part of the notch 122 of the shim plate 118. At least one of the plates 138 serves as a guide and locator when placed in contact with the guide arm 18 seen in FIG. 1. If any of the fixture components become worn or misaligned, quality of the vial seal is reduced.

The movable heater bar assembly 44 is essentially the same as that described for the stationary heater bar assembly 32 above, the only difference being the attachment of the toggle arm connector blocks 46, the lifting handle 52, and the switch actuator assembly 68. It should also be noted that both the movable and stationary heater bars are water cooled. Heater bar wiring is improved by passing the wiring through the vertical plate 14, capturing the wiring along the heater bar groove 76, shown in FIG. 5, where the wiring terminates at the terminal connector studs 94 located at each end of the heater bars 32, 44.

It has been found that the heater bar assemblies 32, 44 may also be configured whereby the bar 72 also includes the spacer bar element 114 as an intergral piece. In which case a slit is provided between the spacer bar poriton and the upper surface of the bar adjacent to face 102 for insertion of a portion of the insulating tape 112, thereby eliminating the need for upper brass strip 82. This configuration reduces the number of pieces required thereby reducing inventory.

Figure 8:
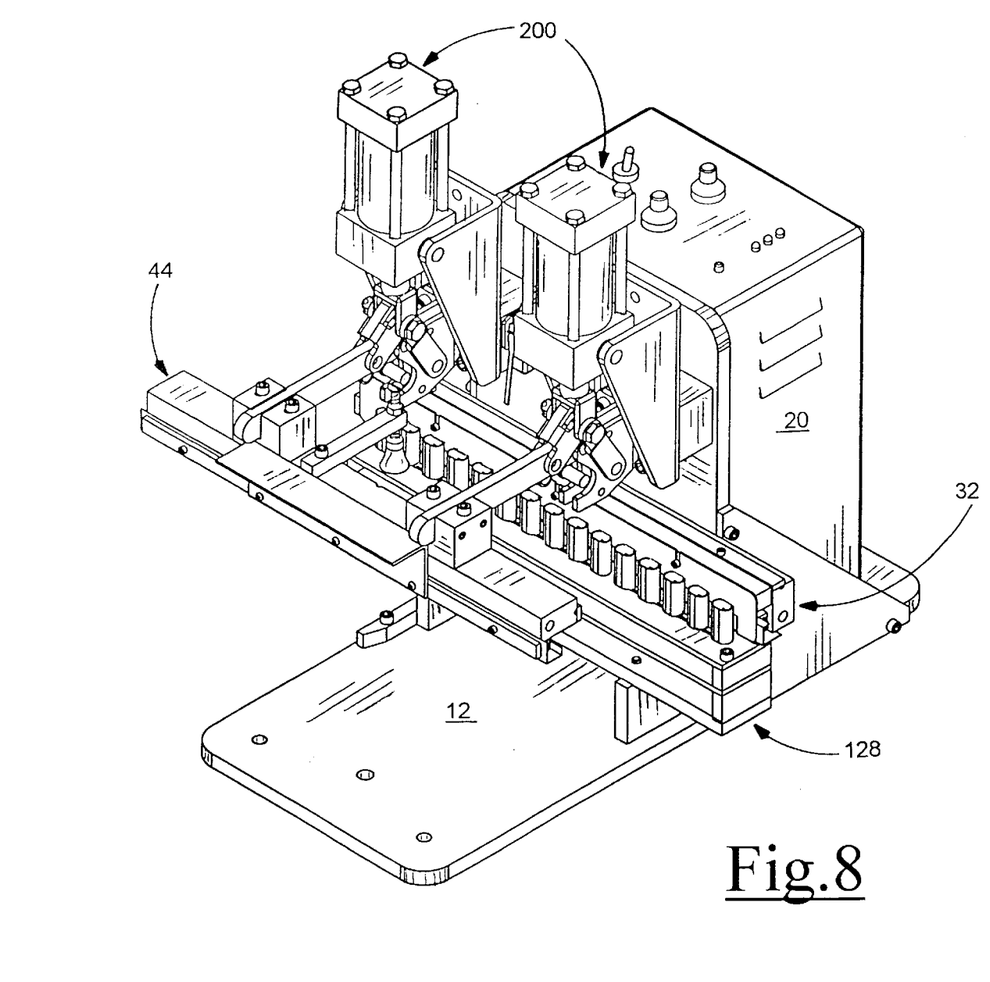
FIG. 8 is an isometric view of pneumatic operated assembly.

Obviously, pneumatic operation of the heat sealing machine described above would be advantageous. However, in the past, a completely different configuration was required by the manufacturer for pneumatic heat sealing operation requiring purchase of a new machine. However, it is much more efficient to simply provide a conversion package for attaching pneumatic actuators to the existing apparatus as seen in FIG. 8. The pneumatic conversion only requires that the handle assembly 34 be removed and the twin pneumatic cylinder and pivotal support assemblies 200 installed. The assemblies 200 include adapter linkage and all mounting hardware, as well as air line connectors and operation valve, ready for connection to a pneumatic pressure source.

Because many varying and different embodiments may be made within the scope of the inventive concept herein taught, and because many modifications may be made in the embodiments herein detailed in accordance with the descriptive requirement of the law, it is to be understood that the details herein are to be interpreted as illustrative and not in any limiting sense.

What is claimed is:

1. A vertical impulse heat sealing apparatus comprising:
   a) an elongated base plate having a work surface;
   b) a mounting plate having a mounting surface and a control surface, the mounting plate attached vertically perpendicular to said work surface;
   c) an electrical control system attached to said control surface of said mounting plate;
   d) an electrical enclosure having external operators and indicator lights attached externally thereto, enclosing said electrical control system attached to said control surface and said work surface of said base plate;
   e) a pair of toggle clamps, each having a handle and clamp arm, said toggle clamps attached perpendicular to said mounting surface, said lever arm of each said toggle clamp being connected to a cross bar, said cross bar having a handle attached perpendicular thereto;
   f) a movable heater bar assembly commonly attached to each said clamp arm;
   g) a means for locking at least one of said toggle clamps in an open position;
   h) a handle means attached to said movable heater bar for manually lifting said movable heater bar into said open position;
   i) a fixed heater bar assembly attached to said mounting surface at a location and in a manner whereby a surface of said movable heater bar assembly and said fixed heater bar assembly are aligned and in close proximity when said toggle clamps are in a closed position.

2. The vertical, impulse heat sealing apparatus according to claim 1 wherein said apparatus further comprises a start switch having an operator, the switch located adjacent said toggle clamp.

3. The vertical, impulse heat sealing apparatus according to claim 2 wherein said apparatus further comprises an adjustable switch actuation assembly attached to said movable heater bar assembly, the actuation assembly comprising a connecting bar, a threaded extender rod, and a contact member, said extender rod adjusted in a manner whereby said contact member is capable of activating said operator stem when said movable heater bar assembly is in close proximity with said stationary heater bar assembly.

4. The vertical, impulse heat sealing apparatus according to claim 1 wherein said means for locking is a pivotal lock bar attached to said clamp arm of at least one of said toggle clamps in a manner whereby said pivotal lock bar is parallel to said clamp arm and is capable of being manually positioned into a notch cut into a bracket portion of said toggle clamp.

5. The vertical, impulse heat sealing apparatus according to claim 1 wherein said movable and fixed heater bars each comprise:
   a) an elongated bar having a mounting surface, a wire channel, a heater strip mounting surface and a shim plate mounting surface, transverse mounting holes extending through said shim plate mounting surface, a longinatudnal passage extending the length of said elongated bar having a threaded counter bore at each end., a notch having a blind bore therein located at each end of said elongated bar, and a longitudnal slot located mesial said heater strip mounting surface and said shim plate mounting surface;
   b) a strip covering said wiring channel attached to said elongated bar;
   c) a heater termination assembly inserted within each said notch, said termination assembly temporaily retained in biased compression by a set screw;
   d) an elongated strip of insulating tape covering said heater strip mounting surface;
   e) an eleongated heater strip attached to each said heater termination assembly and retained in tension thereby;
   f) an insulating cover strip inserted into said slot and retained therein said cover strip covering said heater strip and further retained to said elongated bar by an elongated retaining strip; and
   g) an eleongated shim strip having a plurality of notches therein attached to said shim plate mounting surface.

6. The vertical, impulse heat sealing apparatus according to claim 1 wherein said movable and fixed heater bars each comprise:
   a) an elongated "L" shaped bar having a vertical leg portion and a horizontal leg portion, said vertical leg portion having an upper edge and an exposed face, said horizontal leg portion having upper, lower and heater face, said horizontal leg having a drilled and notched portion at each end;
   b) a plurality of mounting holes for attaching said bar to said heat sealing apparatus;
   c) a groove running the length of said upper edge of said vertical leg portion;
   d) a means for covering said groove attached to said upper edge;
   e) an orifice running the length of said vertical leg portion, said orifice tapped at each end to receive tubular fittings;
   f) a biased termination means for connecting electrical power to a heater strip and maintaining tension thereon fitted into said drilled and notched portion of said horizontal bar;
   g) a means for locking said termination means with said termination means in biased compression;
   h) a high temperature insulating tape covering all exposed surfaces of said heater face including portions of said notched portion;
   i) a heater band extended along the length of said heater face and attached to said termination means;
   j) a high temperature insulating strip covering said upper, lower and heater face, including said heater band, and held in position by a strip attached to each said upper and lower face of said horizontal leg portion;
   k) a spacer bar attached to said vertical leg portion adjacent said upper face of said horizontal leg portion; and
   l) an elongated shim plate having upper and lower edges and adjusting slots along said upper side and notches along said lower side, spacing between said notches equal to spacing between web linked vials, said shim plate attached to said spacer bar.

7. The vertical, impulse heat sealing apparatus according to claim 6 wherein said termination means comprises:
   a) a ceramic block;
   b) a pin extending outwardly from said block;
   c) a stud threadable attached to said block opposite said pin;
   d) a nut and washer cooperative with said stud; and
   e) a spring slidable over said pin.

8. The vertical, impulse heat sealing apparatus according to claim 6 wherein said means for locking said termination assembly is a set screw located in said upper face of said horizontal leg portion.

9. The vertical, impulse heat sealing apparatus according to claim 6 wherein said apparatus further comprises a vial filling and sealing fixture comprising:
   a) a base plate;
   b) first and second plates attached to said base plate in a spaced apart relationship, said first and second template plates custom machined to accept a plurality of polymeric vials web linked in groups;
   c) a pair of spacer plates attached to said base plate sized and placed to position said fixture and said polymeric vials relative to said shim plate.

10. The vertical, impulse heat sealing apparatus according to claim 9 wherein said sealing fixture is capable of containing at least three groups of five web linked vials for filing and sealing.

11. The vertical, impulse heat sealing apparatus according to claim 1 further comprising capability of being converted to pneumatic operation with a field conversion kit comprising a pair of pneumatic cylinders, pivotal support assemblies comprising adapter linkage, mounting hardware, air line connectors, and a control valve.

* * * * *